Sept. 6, 1932.  W. J. ASSEL  1,875,797

TUBULAR AXLE

Filed Feb. 2, 1931

INVENTOR
Walter J. Assel
HIS ATTORNEYS

Patented Sept. 6, 1932

1,875,797

UNITED STATES PATENT OFFICE

WALTER J. ASSEL, OF CANTON, OHIO, ASSIGNOR TO THE TIMKEN ROLLER BEARING COMPANY, OF CANTON, OHIO, A CORPORATION OF OHIO

TUBULAR AXLE

Application filed February 2, 1931. Serial No. 513,006.

This invention relates to tubular axles, especially axles of the type that are provided with swinging knuckles at their ends. The principal objects of the invention are to simplify the construction and the process of assembling the parts of the axles, and to produce an axle of great strength and lightness. The invention consists principally in inserting in the ends of the tubular axle body certain members that serve to reinforce the tubular body, provide bearings for the spring securing bolts and for the knuckle pins and are adapted to automatically shape the ends of the tubular body for frictional engagement with such reinforcing members and for better taking care of the mechanical stresses to which the end portions of the axle are subject in service. The invention further consists in the process hereinafter described and claimed and in the combinations and arrangements of parts hereinafter described and claimed.

Figure 1:
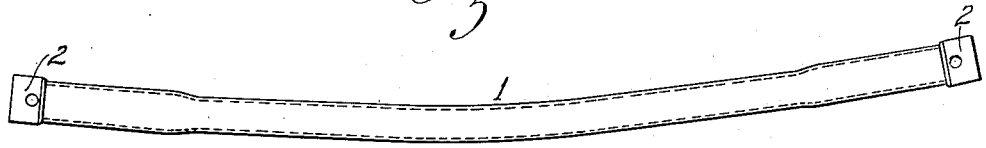
Figure 2:
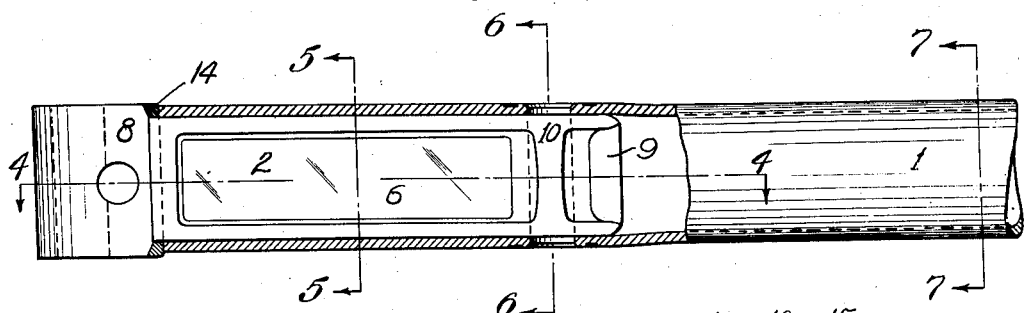

In the accompanying drawing, wherein like reference numerals refer to like parts wherever they occur, Fig. 1 is a side elevation of an axle embodying my invention, Fig. 2 is an enlarged side view of the left end portion of the axle shown in Fig. 1, the endmost portion of the tube and the soldering or welding material being shown in vertical section.

Figure 3:
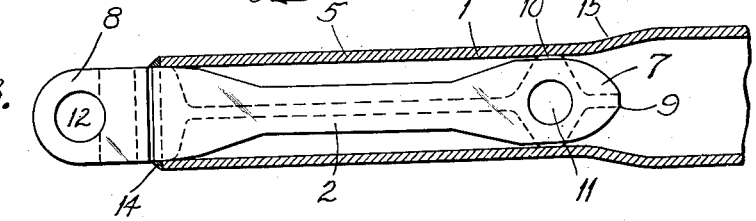
Figure 4:
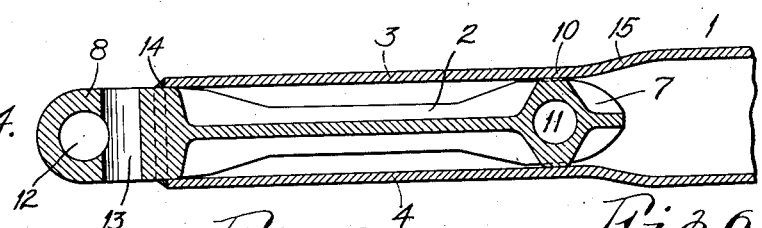

Fig. 3 is a view of the end portion of an axle, showing the end of the tube in horizontal section and showing the insert in plan, Fig. 4 is a horizontal section of the end portion of the axle on the line 4—4 of Fig. 2, Figs. 5, 6 and 7 are vertical cross-sections on the lines 5—5, 6—6 and 7—7, respectively, of Fig. 2.

Figure 5:
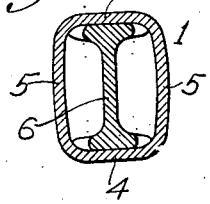
Figure 6:
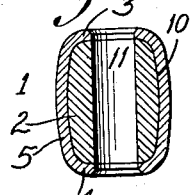
Figure 7:
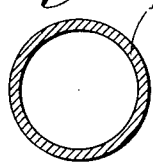

The body portion 1 of my axle is a section of commercial tubing of circular cross-section. Into each end of this tubular body is pressed a member 2, hereinafter called an insert, which operates, after the manner of a mandrel, to change the cross-sectional shape of the end portion of the tubular body from a circle, as shown in Fig. 7, to an oblong form, that is, to a form which has substantially straight and relatively short top 3 and bottom 4, and sides 5 that are relatively long and slightly convexed, the corners of the oblong being rounded, all as shown in Figs. 5 and 6.

The insert comprises an elongated body portion of I-section 6, a front or inner end portion 7, and a rear or outer end portion 8. The top and bottom surfaces of the body portion of the insert are substantially flat and parallel and spaced apart a distance slightly greater than the diameter of the circular portion of the tubular body. At their front ends, said top and bottom surfaces converge sufficiently to bring them closer together at the tip 9 than the diameter of the circular portion of the tubular body. The front or inner end portion of the insert has vertical ribs 10 at its sides that are slightly convexed endwise and rounded at their outer corners, the horizontal distance between the outer surfaces of said ribs being less than the diameter of the circular portion of the tubular body. This front end of the tube is provided with a vertical hole 11 for the spring fastening bolt, which hole is preferably drilled therein after the insert is mounted in the tubular body.

The rear or outer end of the insert is preferably in the shape of a solid plug of proper size and shape to fit in the oblong end of the tubular body, with the greater portion of the plug projecting beyond the end of said tubular body. It is convenient to make the part of the plug which enters the tubular body of the same size and shape as that given the bore by the mandrel action of the front end of the insert; but it is obvious that such plug may be shaped to itself function as a mandrel to further tighten the grip of the metal on said plug. The projecting portion of the plug is provided with a vertical hole or bore 12 to receive the knuckle pin or bearing therefor; and it is also provided with a horizontal or cross-bore 13 for a locking pin. The portions of the top and bottom of the middle or body portion of the insert are preferably made of reduced width, and the tip of the front end portion is preferably rounded.

In building my axle, the tip of the front end of the insert is entered into the end of the circular body tube, and is then pressed endwise therein. In this operation, the front end of the insert functions as a mandrel which spreads apart the top and bottom of the body tube and at the same time causes the sides of such tube to approach each other and hug the vertical ribs 10 of the insert, the result being that the body tube takes the same form as a section through the side ribs of the front portion of said insert. As the end of the tubular body receives its cross-sectional shape partly from the ribs at the front end of the insert, such cross-sectional shape extends inwardly of said tubular body as far as said ribs, that is, as far as the spring seat for locating and securing which the bolt hole is located between the ribs of said insert. Of course, the bolt hole extends through the body tube as well as through the insert itself. It is noted as a special merit that the change from the circular section of the tubular body to the oblong section is quite gradual as shown at 15, and does not involve any great working of the mental or concentration of stress therein such as would be involved by abruptly changing the shape of the axle by means of forging dies.

By reason of the shape and size of the insert relative to the bore of the body tube, the operation of forcing the insert into the body tube effects such a press-fit between them that the insert is held firmly in place by friction. In addition to this frictional engagement, it is desirable to weld the parts together. For instance, as indicated at 14, the endmost portion of the body tube may be autogenously welded to the solid portion of the insert that projects therefrom; and the body tube may be spot-welded to the ribs and top of the front end of said insert, as indicated at 16.

Preferably, the insert is made as a die-forging, and the holes therein are made after the insert is mounted in the body tube. Likewise, the hole for the spring bolt is preferably made in the body tube after the insert is mounted in said body tube. As the insert is frictionally held in the first instance, it is readily adjustable in case of necessity at any time prior to welding. It is noted that the end portions of the axle are inclined upwardly at a slight angle throughout the length of the insert.

What I claim is:

1. An axle comprising a hollow tubular body of circular section throughout its middle portion, and inserts welded in the ends of said tubular body, each insert comprising an inner end portion inside of said tubular body, an outer end portion partly inside and partly beyond the end of said tubular body and an intermediate portion, said inner end portion being at its tip of less depth and width than the diameter of the circular bore of the tubular body but increasing gradually in depth beyond such diameter, and said inner end portion also having convex vertical ribs on its sides in position for the side walls of the tubular body to press against when said insert is forced into said tubular body.

2. An axle comprising a hollow tubular body of circular section throughout its middle portion and with its end portions inclining slightly upwardly and outwardly, and inserts mounted in the ends of said tubular body, each insert comprising an inner end portion inside of said tubular body, an outer end portion partly inside and partly beyond the end of said tubular body and an intermediate portion, said inner end portion being at its tip of less depth and width than the diameter of the circular bore of the tubular body but increasing gradually in depth beyond such diameter, and said inner end portion also having convex vertical ribs on its sides in position for the side walls of the tubular body to press against when said insert is forced into said tubular body.

3. An axle comprising a hollow tubular body of circular section throughout its middle portion, and inserts in the ends of said tubular body, each insert comprising an inner end portion inside of said tubular body, an outer end portion partly inside and partly outside of said tubular body and an intermediate portion, said inner end portion being at its tip of less depth and width than the diameter of the circular bore of the tubular body but increasing gradually in depth beyond such diameter and said inner end portion also having convex vertical ribs on its sides in position for the side walls of the tubular body to press against when said insert is forced into said tubular body, a cross section through the inner part of the outer end portion being substantially the same in size and shape as a cross section of the inner end portion through its ribs, said insert having vertically disposed holes through its inner and outer end portions.

4. An axle comprising a hollow tubular body of circular section throughout its middle portion, and inserts in the ends of said tubular body, each insert comprising an inner end portion inside of said tubular body, an outer end portion partly inside and partly outside of said tubular body and an intermediate portion, said inner end portion being at its tip of less depth and width than the diameter of the circular bore of the tubular body but increasing gradually in depth beyond such diameter and said inner end portion also having convex vertical ribs on its sides in position for the side walls of the tubular body to press against when said insert is forced into said tubular body, a cross section through the inner part of the outer end portion being substantially the same in size and shape as a cross section of the inner end portion through its ribs, the insert and the tubular body being welded together, said insert having vertically disposed holes through its inner and outer end portions.

Signed at Canton, Ohio, this 16 day of January 1931.

WALTER J. ASSEL.